US009567047B2

(12) United States Patent
Gurr et al.

(10) Patent No.: US 9,567,047 B2
(45) Date of Patent: Feb. 14, 2017

(54) REBREATHER CONTROL PARAMETER SYSTEM AND DIVE RESOURCE MANAGEMENT SYSTEM

(76) Inventors: Kevin Gurr, Poole (GB); Nicholas J. K. Bushell, Poole (GB)

(*) Notice: Subject to any disclaimer, the term of this patent is extended or adjusted under 35 U.S.C. 154(b) by 497 days.

(21) Appl. No.: 12/862,758

(22) Filed: Aug. 25, 2010

(65) Prior Publication Data
US 2012/0048273 A1 Mar. 1, 2012

Related U.S. Application Data

(60) Provisional application No. 61/236,426, filed on Aug. 24, 2009.

(51) Int. Cl.
*A61M 16/00* (2006.01)
*A62B 7/00* (2006.01)
*B63C 11/24* (2006.01)
*B63C 11/02* (2006.01)
*G05D 11/13* (2006.01)

(52) U.S. Cl.
CPC .............. *B63C 11/24* (2013.01); *B63C 11/02* (2013.01); *G05D 11/138* (2013.01); *B63C 2011/021* (2013.01)

(58) Field of Classification Search
CPC .. A61M 16/00; A61M 16/0051; A61M 16/12; A61M 2016/1025; A61M 2016/0039; A61M 16/0883; A61M 16/0891; A61M 16/10; A62B 7/00; A62B 7/02; A62B 7/04; A62B 7/08; A62B 9/00; A62B 11/00; A62B 19/00; B63C 11/00; B63C 11/02; B63C 11/34–11/36; B63C 2011/021–2011/028

USPC ........... 128/204.22, 205.28, 205.12, 205.17, 128/205.22, 205.27, 200.24, 201.27, 128/201.29, 204.23, 202.22, 205.23; 405/185–187

See application file for complete search history.

(56) References Cited

U.S. PATENT DOCUMENTS

| 4,120,300 A * | 10/1978 | Tiep .................. 128/204.24 |
| 4,206,754 A * | 6/1980 | Cox et al. ............ 128/204.21 |
| 5,036,841 A * | 8/1991 | Hamilton ............ 128/202.26 |
| 5,503,145 A * | 4/1996 | Clough ............... 128/204.22 |
| 6,302,106 B1 * | 10/2001 | Lewis ................. 128/204.22 |
| 6,817,359 B2 * | 11/2004 | Deas et al. ........... 128/201.27 |
| 2006/0201508 A1 * | 9/2006 | Forsyth et al. ........ 128/204.26 |
| 2007/0215157 A1 * | 9/2007 | Straw ................. 128/205.12 |

* cited by examiner

*Primary Examiner* — Tan-Uyen (Jackie) T Ho
*Assistant Examiner* — Ned T Heffner
(74) *Attorney, Agent, or Firm* — Powley & Gibson, P.C.

(57) ABSTRACT

A method and apparatus for automatically controlling partial pressure of oxygen in the breathing loop of a rebreather diving system. A diver may adjustably select a control parameter to maintain partial pressure of oxygen at a setpoint that varies with ambient pressure and is within a range between a maximum safe partial pressure of oxygen at depth and a minimum safe partial pressure of oxygen for the purpose of biasing the performance of the rebreather either towards minimizing gas venting from the rebreather breathing loop or minimizing decompression time. A method and apparatus for managing and monitoring the use of dive resources in comparison with a target dive time specified by the diver, calculating and indicating remaining dive time based on dive resource values and calculating and indicating dive resource values required to meet preselected dive resource end values and dive requirements.

13 Claims, 7 Drawing Sheets

REBREATHER CONTROL PARAMETER SYSTEM AND DIVE RESOURCE MANAGEMENT SYSTEM

CROSS-REFERENCE TO RELATED APPLICATIONS

The present application claims the benefit of U.S. Application No. 61/236,426, filed on Aug. 24, 2009, which is incorporated herein by reference.

BACKGROUND

1. Field of the Invention

The present invention relates generally to diving systems and more particularly to systems and apparatuses for controlling and monitoring rebreather systems and managing the use of dive resources.

2. Background Discussion

Self-contained breathing apparatuses used for underwater diving traditionally are categorized either as open circuit systems or rebreather systems. Open circuit systems are relatively simple and well understood in the art but are inefficient and typically require a large breathing gas supply to provide a reasonable dive time. Each breath inhaled by a diver from art open circuit system is exhaled to the surrounding environment, wasting any oxygen in the breathing gas that is not metabolized by the diver during the respiration cycle.

Rebreather systems recycle each breath exhaled by a diver by removing the carbon dioxide generated by the diver and replacing the oxygen consumed by the diver during the respiration cycle. Essential components of rebreather systems are a breathing loop comprising a diver's lungs, a mouthpiece, breathing gas supply, a solenoid or flow valve adapted to add breathing gas to the breathing loop, a pressure regulator for the breathing gas supply, a scrubber canister adapted to remove exhaled carbon dioxide, a counterlung, a valve adapted to vent or purge gas from the breathing loop if the total gas pressure in the breathing loop exceeds a preselected pressure value, flexible, gas-impermeable hoses connecting the various components and unidirectional check valves to control the flow of breathing gas through the loop. Rebreather systems may father be categorized as semi-closed circuit systems or closed circuit systems, with each type of rebreather system comprising additional suitable components. Examples of semi-closed circuit and closed circuit rebreather breathing loops are shown in, for example, U.S. Pat. Nos. 5,503,145 and 6,302,106.

In a semi-closed circuit system known in the art, the breathing gas supply commonly comprises one high pressure cylinder containing an oxygen-enriched gas mixture, which typically is introduced to the breathing loop at a preselected, constant flowrate to replace oxygen consumed during a dive.

In a closed circuit system known in the art, the breathing gas supply commonly comprises one high pressure cylinder containing pure oxygen. A closed circuit system known in the art would additionally typically comprise one or more oxygen sensors adapted to measure the partial pressure of oxygen in the breathing loop during a dive and a computer processor adapted to control the solenoid for the purpose of adding oxygen to the breathing loop as needed to maintain the oxygen partial pressure above a minimum, viable value. A closed circuit system also commonly comprises a high pressure cylinder containing an inert gas or mixture of inert gases, also referred to as diluent gases, that may be added to the breathing loop via a solenoid and pressure regulator to prevent the counterlung from collapsing due to increasing ambient pressure.

A primary consideration in the design and use of semi-closed and closed circuit rebreather systems is the minimization of the risks of hypoxia, in which the diver is deprived of a life-sustaining oxygen supply, and hyperoxia, which occurs when the diver breathes unsafe elevated oxygen levels. Hypoxia can render a diver unconscious and cause drowning. Hyperoxia may lead to oxygen toxicity, which can have severe physiological effects that can lead to the death of the diver. Oxygen toxicity can manifest as either central nervous system (CNS) oxygen toxicity or pulmonary oxygen toxicity.

Hypoxia and hyperoxia are understood as depending on the partial pressure of oxygen in the breathing gas loop. The partial pressure of oxygen is equal to the product of the total pressure of the gas mixture and the concentration, or fraction, of oxygen in the gas mixture, also expressed as $PPO_2 = P_{total} \times FO_2$. Total gas pressure in the breathing loop increases with ambient pressure, which increases by one atmosphere, or bar, per each ten meters of depth. Accordingly, at a constant oxygen concentration, the partial pressure of gas in the breathing loop increases as depth increases and decreases as depth decreases.

Hypoxia occurs when the partial pressure of oxygen in the breathing loop is less than 0.21 bar, which is the ambient partial pressure of oxygen in the atmosphere at sea level. The minimum life-sustaining value of partial pressure of oxygen is 0.16 bar. Maintaining the partial pressure of oxygen in the breathing loop above 0.21 bar will minimize decompression time for the diver. However, pulmonary oxygen toxicity can result from prolonged exposure to oxygen partial pressures above approximately 0.5 bar, and CNS oxygen toxicity becomes a significant risk when the partial pressure of oxygen in the breathing loop is greater than 1.6 bar.

In semi-closed circuit systems, the oxygen-enriched gas mixture is usually added to the breathing loop at a constant rate selected to maintain the partial pressure of oxygen in the breathing loop between 0.21 bar and 1.6 bar based on the estimated oxygen consumption profile of the diver during a dive. However, the rate of addition typically is not automatically adjusted during a dive in response to the actual partial pressure of oxygen in the breathing loop, even though a diver's rate of oxygen consumption, and therefore the oxygen concentration in the breathing loop, may deviate considerably from the rate of consumption estimated prior to the dive. Inequality between the rate of addition and rate of consumption of oxygen can result in depletion or accumulation of oxygen in the breathing loop. Therefore, transient states may occur and persist in semi-closed systems during which the breathing loop contains either hypoxic (i.e. less than 0.21 bar) or hyperoxic (i.e. greater than 1.6 bar) oxygen levels.

Closed circuit rebreather systems provide monitoring and adjustable control of the partial pressure of oxygen in the rebreather breathing loop during a dive. In recognition of the safety and performance concerns outlined above, closed circuit rebreather systems will usually be configured to maintain the partial pressure of oxygen in the breathing loop at a preselected value between 0.21 bar and 1.6 bar for the purpose of reducing the risk of hypoxia and hyperoxia. However, the sensors and automated control systems in closed circuit systems are susceptible to malfunctions, which can lead to hypoxic or hyperoxic oxygen levels in the breathing loop. Additionally, the use of pure oxygen in closed circuit systems creates handling and cleanliness issues with regard to the breathing gas supply.

A further disadvantage of semi-closed circuit and closed circuit systems is that excessive venting of gas from the breathing loop may occur. Semi-closed circuit systems are inherently inefficient because the fixed rate of addition of the oxygen-enriched gas mixture to the breathing loop may exceed the diver's rate of oxygen consumption and cause continual venting or purging of gas from the breathing loop to maintain total gas pressure in the breathing loop below a threshold value.

In closed circuit systems, excessive venting may occur during the ascent phase, during which ambient pressure, and correspondingly total gas pressure and partial pressure of oxygen in the breathing loop, decrease. For example, if the preselected control value for oxygen partial pressure in the breathing loop is set close to 1.6 bar for the purpose of minimizing the diver's decompression time, the closed circuit rebreather control system will increase the addition of oxygen to the breathing loop to compensate for the decrease in partial pressure of oxygen that results from the decrease in ambient pressure. However, the increased volume of gas added to the breathing loop will be vented to maintain total gas pressure in the breathing loop below a threshold value.

The rate of venting of unutilized breathing gas from semi-closed circuit and closed circuit systems may be less than typically experienced with an open circuit system but may nonetheless be sufficient to reduce total dive time or necessitate the use of a larger gas supply to accommodate decompression time during ascent. Additionally, the venting of gas from the breathing loop creates bubbles that may, for example, startle marine life that the diver is attempting to observe, visibly indicate the presence of the diver to observers on the surface or have other undesirable effects.

In view of the limitations of rebreather systems brown in the art, a need exists for a rebreather system that provides adjustable control over the partial pressure of oxygen in the breathing loop as well as control over the volume of gas in the breathing loop, and therefore the rate of gas venting from the breathing loop. Such a system would also desirably be free of the disadvantages of using pure oxygen as a breathing gas supply.

Dive monitoring systems known in the art continuously measure, calculate and display parameters such as remaining gas supply, decompression time, partial pressure of oxygen in the breathing loop and depth during a dive to keep a diver informed of the dive profile. These devices are typically configured to display the current status or value of one or more parameters corresponding to dive resources and may also be adapted to assist the diver in pre-planning the dive based on end-of-dive requirements. There is a need for a dive monitoring system configured to continuously inform the diver of remaining dive time based on current dive resources and their usage, inform the diver of the dive resources required based on the dive plan specified by the diver and automatically adjust partial pressure of oxygen in the breathing loop as needed to make it possible for a diver to achieve a target dive time.

SUMMARY OF INVENTION

An object of this invention is a method for adaptively controlling partial pressure of oxygen in the breathing loop of a rebreather such that the setpoint for partial pressure of oxygen may vary as a function of ambient pressure within a range established by safety considerations and such that a diver can adjust the performance of the rebreather between minimizing gas venting from the rebreather breathing loop and minimizing decompression time. According to the inventive method, the diver specifies values for a control parameter, a minimum value of partial pressure of oxygen, a reduction coefficient and concentration of oxygen in a gas supply, and a maximum operating value of partial pressure of oxygen is calculated as a function of ambient pressure, concentration of oxygen in the gas supply and the first reduction coefficient. A setpoint for partial pressure of oxygen is calculated as a function of the control parameter, the minimum value of partial pressure of oxygen and the maximum operating value of partial pressure of oxygen. A portion of the gas supply is added to the breathing loop if the partial pressure of oxygen is less than the setpoint for partial pressure of oxygen, or is less than the minimum value of partial pressure of oxygen. In accordance with the invention, minimum and maximum viable partial pressures of oxygen are chosen as limiting values. The gas supply may consist of either pure oxygen having an oxygen concentration of 100%, in which case the value of the setpoint for partial pressure of oxygen is limited to an absolute maximum value selected to avoid increased risk of central nervous system oxygen toxicity or an oxygen-enriched gas mixture having an oxygen concentration of less than 100%, in which case a gas supply is selected to having a concentration of oxygen for which partial pressure of oxygen will not exceed a selected value at a maximum planned dive depth. In some embodiments, the control parameter has a value of 0% to 100%, and the reduction coefficient has a value of 0.75 to 0.95

Another object of this system is an automatic control system configured to adaptively control partial pressure of oxygen in the breathing loop in accordance with the present invention. The automatic control system comprises a rebreather breathing loop and a processor adapted to receive data for partial pressure of oxygen in the rebreather breathing loop, ambient pressure, a selected minimum value of partial pressure of oxygen, a selected concentration of oxygen in the gas supply, a selected value of a first reduction coefficient and a selected value of a first control parameter; calculate a maximum operating value of partial pressure of oxygen as a function of ambient pressure, the selected concentration of oxygen in the gas supply and the selected value of the first reduction coefficient; calculate a setpoint for partial pressure of oxygen as a function of the selected value of the first control parameter, the selected value of a first control parameter and the selected minimum value of partial pressure of oxygen; compare data for partial pressure of oxygen in the rebreather breathing loop with the setpoint for partial pressure of oxygen; and send a signal to add a portion of the gas supply to the rebreather breathing loop if the partial pressure of oxygen in the rebreather breathing loop is less than the setpoint for partial pressure of oxygen.

Another object of this invention is a method for managing the use of dive resources. A target dive time is selected, and a target remaining dive time is calculated from a measurement of elapsed dive time. Dive resource net effects of gas supply duration, scrubber canister duration and battery duration and remaining dive times corresponding to each dive resource net effect are calculated from dive resources corresponding to pressure of a gas supply, scrubber capacity and battery capacity and dive resource usage rates corresponding to decrease in pressure of the gas supply over time, number of injections from the gas supply into the rebreather breathing loop over time and electrical current. Required dive times are calculated from dive variables corresponding to depth, elapsed dive time, partial pressure of oxygen in the rebreather breathing loop, concentration of carbon dioxide in the rebreather breathing loop and temperature of the scrubber canister and dive time limitations corresponding to no decompression limit, decompression time and central nervous system oxygen toxicity percentage. A termination time is identified corresponding to the lowest value of the target remaining dive time and each of the remaining dive times. In accordance with the invention warning indicator is displayed if the required dive time is equal to or greater than the termination time, and otherwise the termination time is displayed. In some embodiments, if the required dive time is equal to or greater than the termination time, the setpoint for partial pressure of oxygen is reduced within safety limits to increase termination time and enable completion of the dive as planned.

Another object of this system is a dive resource management system configured to monitor and manage dive resources, dive resource usage rates, dive resource net effects, dive variables and dive time limitations. In certain embodiments, the dive resource management system displays information and warnings corresponding to the status of dive resources and dive time limitations relative to a target dive time. In certain embodiments, the dive resource management system, automatically adjusts the setpoint for partial pressure of oxygen to conserve dive resources if required dive time limitations exceeds target remaining dive time.

Other systems, methods, features, and advantages of this invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF DRAWINGS

These and other features, aspects and advantages of this invention will become better understood with regard to the following description, appended claims and accompanying drawings where:

DETAILED DESCRIPTION OF EMBODIMENTS

Figure 1:
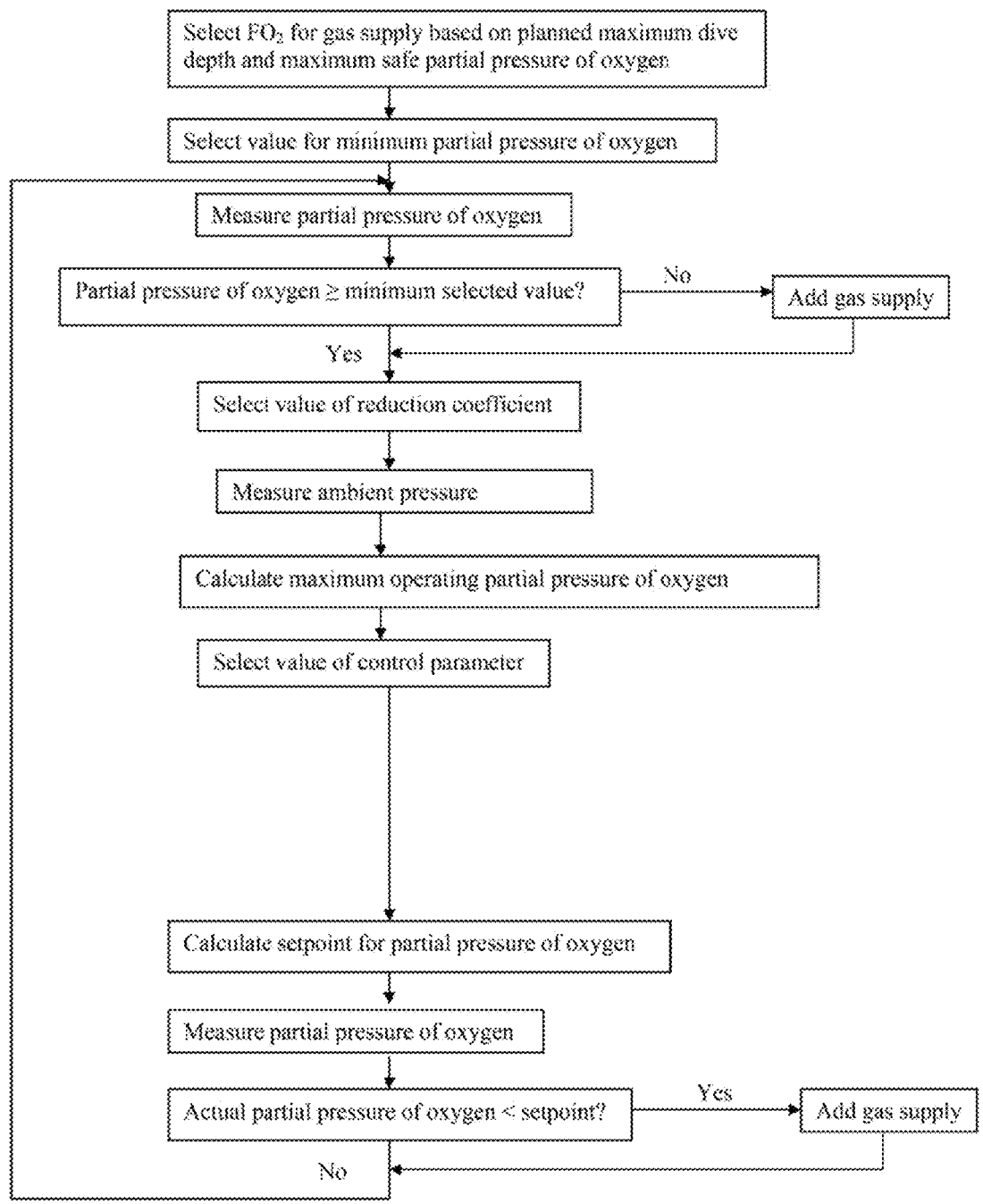
FIG. 1 shows a flowchart of a method embodying features of the present invention for controlling partial pressure of oxygen in the breathing loop of a rebreather system.

A rebreather system in accordance with certain embodiments includes a breathing loop comprising a scrubber canister, a counterlung, a sensor for measuring ambient pressure, a pressure transducer for determining depth, a sensor for measuring partial pressure of oxygen in the rebreather breathing loop, a valve for adding a gas supply to the rebreather breathing loop, a power source, connecting, hoses, check valves, a processor adapted to receive data, execute calculations, send signals to display data and warning indicators and control the actuation of the addition valve, a gas supply pressure regulator and a gas supply consisting of either a single high-pressure source containing an oxygen-enriched gas mixture or a source containing pure oxygen in conjunction with a source containing diluent gas. In certain embodiments, the rebreather system comprises a passive mechanical addition valve that is adapted to add the gas supply to the rebreather breathing loop at a fixed rate if ambient pressure exceeds the total gas pressure in the breathing loop by a preselected value. In certain embodiments, the rebreather system comprises a passive mechanical overpressure valve that is adapted to vent gas from the rebreather breathing loop at a fixed rate if the total gas pressure in the breathing loop exceeds ambient pressure by a preselected value. In some embodiments, the preselected value is 25 mbar.

The processor is implemented, in accordance with the invention, as a microprocessor, microcontroller, digital signal processing circuit or firmware programmed to receive measurement data and perform calculations. A processor in accordance with certain embodiments of this invention capable of being programmed by a user with various user-defined parameters and incorporates a display and buttons, keys, switches or similar articles suitable for inputting information to the processor. The processor includes sensor ports for receiving signals from pressure transducers, oxygen sensors and carbon dioxide sensors, for example. The processor also includes output ports for transmitting signals to components of the rebreather system, including solenoid valves. Suitable processors can be implemented from conventional, commercially-available components having an input and an output bus and including an arithmetic computational ability. Various suitable processors are manufactured by, for example, Renesas and Microchip.

The maximum theoretical partial pressure of oxygen, or $PPO_2$, available to the diver in the breathing loop at any depth is calculated as the product of the concentration of oxygen, or $FO_2$, in the oxygen-enriched gas mixture supply and the ambient pressure, or $P_{ambient}$. Because $P_{ambient}$ varies with depth, the partial pressure of oxygen for the gas supply also varies with depth and reaches a maximum value at the maximum depth of a dive. To maintain the maximum partial pressure of oxygen, or PPO$_2$(max), at safe levels during the course of a dive, in certain embodiments, the may select a gas supply for which the maximum partial pressure of oxygen will not exceed a selected threshold. For example, if the gas supply is an oxygen-enriched gas mixture, the desired maximum partial pressure of oxygen for the duration of the dive is 1.6 bar and the planned maximum dive depth is 40 meters, at which P$_{ambient}$ is 5 bar, then the appropriate concentration of oxygen in the oxygen-enriched gas supply will be equal to or less than PPO$_2$(max)/P$_{ambient}$=1.6 bar/5 bar=32%. Conversely, a known viable minimum partial pressure of oxygen is 0.21 bar, which corresponds to a concentration of oxygen of 21% at 1 bar. The maximum potential dive depth using an oxygen-enriched gas supply and maintaining at least a known viable minimum partial pressure of oxygen is then determined according to PPO$_2$(max)/FO$_2$=1.6/21%=7.6 bar, which corresponds to approximately 66 meters.

Selecting the concentration of oxygen in this manner would allow the oxygen-enriched gas supply to be used safely in an open-circuit bailout configuration of the rebreather system, in which a diver would inhale the oxygen-enriched gas supply without the use of automatic control to maintain the partial pressure of oxygen in the breathing loop below a safe level. In the event that the solenoid valve failed during a dive and remained open to continue providing breathing gas to the diver, selecting the concentration of oxygen according to the maximum planned dive depth would also help insure that the constant addition of the oxygen-enriched gas supply to the breathing loop through the open solenoid valve would not produce excessive partial pressure of oxygen in the breathing loop.

The method of the present invention allows the diver to balance gas usage against decompression requirements by maintaining an adjustable setpoint for partial pressure of oxygen that varies with ambient pressure as dive depth varies. In some embodiments, the diver selects a value for a control parameter expressed as a fraction or percentage of the range between the minimum and maximum safe partial pressures of oxygen. In some embodiments, the value of the control parameter varies between 0% and 100%.

A diver may select the maximum value of the control parameter for the purpose of minimizing decompression time during the dive-ending ascent. Choosing the maximum value of the control parameter would induce the control system to add the gas supply to the rebreather loop in order to maintain a higher target partial pressure of oxygen (closer to the maximum theoretical partial pressure of oxygen value). The increased volume of gas addition may cause increased venting gas from the rebreather loop and higher usage rates of the gas supply. A resulting penalty of choosing the maximum control parameter value may therefore be less efficient use of the gas supply.

This effect is amplified as depth, and ambient pressure, increase. The maximum theoretical partial pressure of oxygen is directly proportional to ambient pressure, and the target partial pressure of oxygen increases with the maximum theoretical partial pressure of oxygen at a constant control parameter value. Accordingly, as depth increases, the rebreather control loop increases the addition of the gas supply to the rebreather loop to maintain the target partial pressure of oxygen, which may produce excessive total gas pressure in the rebreather breathing loop. Excess gas is vented, or purged, automatically from the rebreather breathing loop to maintain total gas pressure in the rebreather loop below a preselected threshold.

Conversely, a diver may select the minimum value of the control parameter for the purpose of minimizing the venting of gas from the rebreather loop and minimizing the consumption of the gas supply. However, by specifying the minimum control parameter value, the diver biases the operation of the rebreather system to maintain a lower target partial pressure of oxygen, which increases the required decompression tune.

At various times during a dive, the diver may wish to either minimize gas venting from the rebreather breathing loop or minimize decompression time. The inventive method and control system enable the diver to increase or decrease the control parameter and the partial pressure of oxygen while a dive is in progress, while staying within safety limits, in order to accommodate changing objectives.

Effects associated with different values of the control parameter are summarized in Table 1, using an exemplary range for partial pressure of oxygen from 0.21 bar to 1.6 bar:

TABLE 1

| Control Parameter Value | PPO$_2$ (bar) | Effects |
| --- | --- | --- |
| 0% to 33% | 0.21 to 0.67 | Low PPO2 |
| | | Low gas venting |
| | | Low gas supply usage |
| | | High decompression requirement |
| | | Short no-decompression time |
| 34% to 66% | 0.67 to 0.93 | Mid-range PPO2 |
| | | Medium gas venting |
| | | Medium gas supply usage |
| | | Average decompression requirement |
| | | Average no-decompression time |
| 66% to 100% | 0.93 to 1.6 | High PPO2 |
| | | High gas venting |
| | | High gas supply usage |
| | | Low decompression requirement |
| | | Long no-decompression time |

Since a diver consumes oxygen, at constant depth, the partial pressure of oxygen in the rebreather breathing loop while in use will always be less than the partial pressure of oxygen in the gas supply. Selecting a maximum partial pressure of oxygen that is equal to the maximum theoretical partial pressure of oxygen at depth could therefore lead to increased addition of the gas supply to the rebreather breathing loop and excessive gas usage if target partial pressure of oxygen is close to maximum theoretical partial pressure. In some embodiments, a reduction coefficient is applied to the maximum partial pressure in order to avoid excessive gas usage. In some embodiments, the value of the reduction coefficient is between 0.75 and 0.95.

Similarly, controlling at low partial pressures of oxygen close to the known viable value of 0.21 bar increases the risk of hypoxia, since the actual partial pressure of oxygen in the rebreather loop can dip below 0.21 bar in response to changes in depth and accompanying changes in target partial pressure of oxygen. Accordingly, it is advantageous to select a minimum partial pressure of oxygen greater than 0.21 bar to ensure viable partial pressure of oxygen during the course of the dive.

FIG. 1 illustrates a method of automatically controlling partial pressure of oxygen in accordance with the present invention for a rebreather configuration using an oxygen-enriched gas supply. A setpoint for the partial pressure of oxygen may be calculated according to the following equations:

$$S = P \times (R \times PPO_2(max) - PPO_2(min)) + PPO_2(min)$$

$$PPO_2(max) = FO_2 \times P_{ambient}$$

where S is the setpoint for the partial pressure of oxygen, P is the control parameter, R is the reduction coefficient. $PPO_2(max)$ is the maximum value of partial pressure of oxygen at a specified depth, $PPO_2(min)$ is the selected minimum partial pressure of oxygen, $FO_2$ is the concentration of oxygen in the gas supply and $P_{ambient}$ is ambient pressure.

The oxygen partial pressure setpoint in a prophetic example with $FO_2=40\%$, $P_{ambient}=3$ bar at 20 meters depth. $PPO_2(min)=0.3$ bar, $R=0.9$ and $P=50\%$ will be $$PPO_2(max)=3 \text{ bar}\times 40\%=1.2 \text{ bar}$$

$$S=0.5\times(0.9\times 1.2 \text{ bar}-0.3 \text{ bar})+0.3 \text{ bar}=0.69 \text{ bar}$$

In a rebreather configuration using a diluent gas and a gas supply containing pure oxygen, the concentration of oxygen in the gas supply would be 100%. Accordingly, it would be possible for the maximum theoretical partial pressure of oxygen to exceed a viable safe limit of for example, 1.6 bar. Therefore, the method illustrated in FIG. 1 would incorporate an additional step by which, if S calculated in accordance with the equations listed above exceeded a viable safe limit for partial pressure of oxygen during a dive, then the value of S would be set at the viable safe limit.

In accordance with this method, the setpoint is adjusted to a partial pressure of oxygen that can be maintained within the limits established by safety considerations and depth, and the control parameter may be varied to suit the dive plan and yield a setpoint that balances decompression time and gas usage. If the partial pressure of oxygen in the rebreather breathing loop is below the setpoint, a portion of the gas supply is added to the rebreather breathing loop to increase the partial pressure of oxygen to the setpoint. In some embodiments, the gas supply will be added to the rebreather breathing loop in pulses of 1 liter per second. If the partial pressure of oxygen in the rebreather loop is above the setpoint, no action will be taken by the control system and excess oxygen will be metabolized by the diver until the partial pressure of oxygen decreases to the setpoint.

One of ordinary skill in the art will understand that a control system of the present invention will maintain partial pressure of oxygen in the rebreather loop within a small range relative to the setpoint. In certain embodiments, partial pressure of oxygen in the rebreather loop will be controlled to the value of the setpoint±0.05 bar.

In accordance with the method shown in FIG. 1, measured data is updated by the processor of the present invention at a rate specified by the control loop. The method in accordance with the present invention may be executed repeatedly at a rate sufficient to ensure that the partial pressure of oxygen in the breathing loop will remain in a viable range to ensure diver safety. In some embodiments, data measurements and calculations will be performed once per second, which is reflective of well-blown response times for changes in partial pressure of oxygen in the rebreather loop. One with skill in the art will understand that the parameters of measuring rate and control loop execution rate can be adjusted within limits suitable to maintain partial pressure of oxygen in the breathing loop within safe limits.

The dependence of oxygen partial pressure setpoint and measured partial pressure of oxygen on dive depth and the control error difference between setpoint and measured partial pressure is shown in FIGS. 2, 3, 4 and 5. These graphical representations display data collected during a test dive conducted using a mechanical breathing apparatus made by Ansti Test Systems Ltd., with the following test conditions: $FO_2=40\%$, $PPO_2(min)=0.3$ bar, $R=0.9$ and $P=50\%$.

Figure 2:
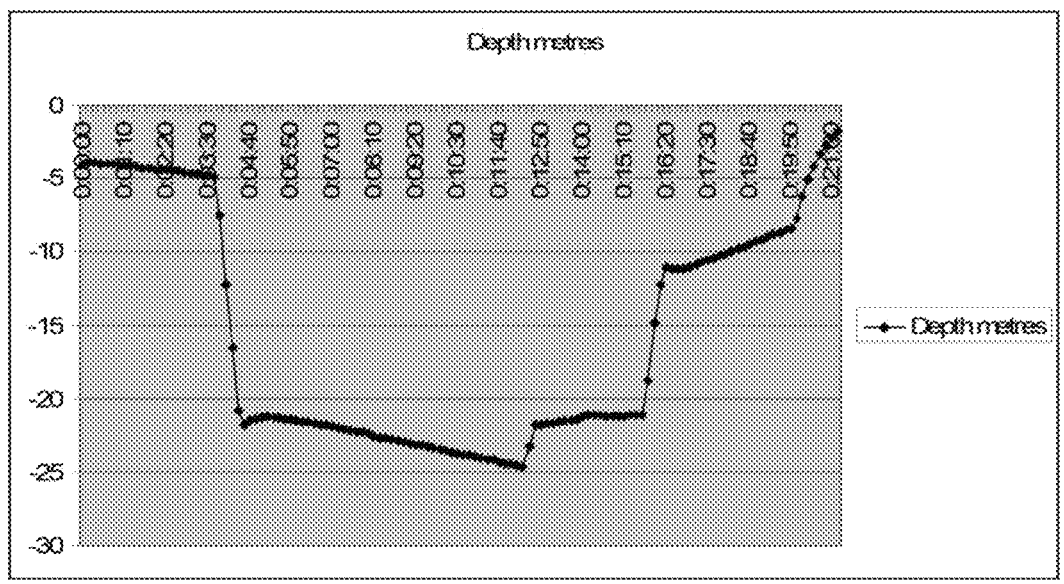
FIG. 2 shows an exemplary graphical representation of dive depth plotted as a function of time.
Figure 3:
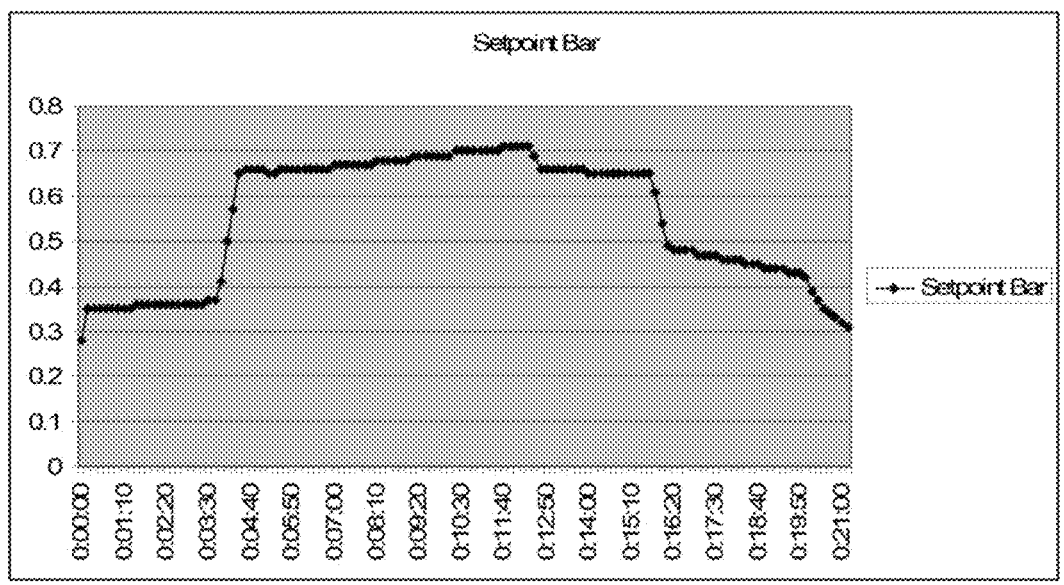
FIG. 3 shows an exemplary graphical representation of setpoint for partial pressure of oxygen plotted as a function of time.
Figure 4:
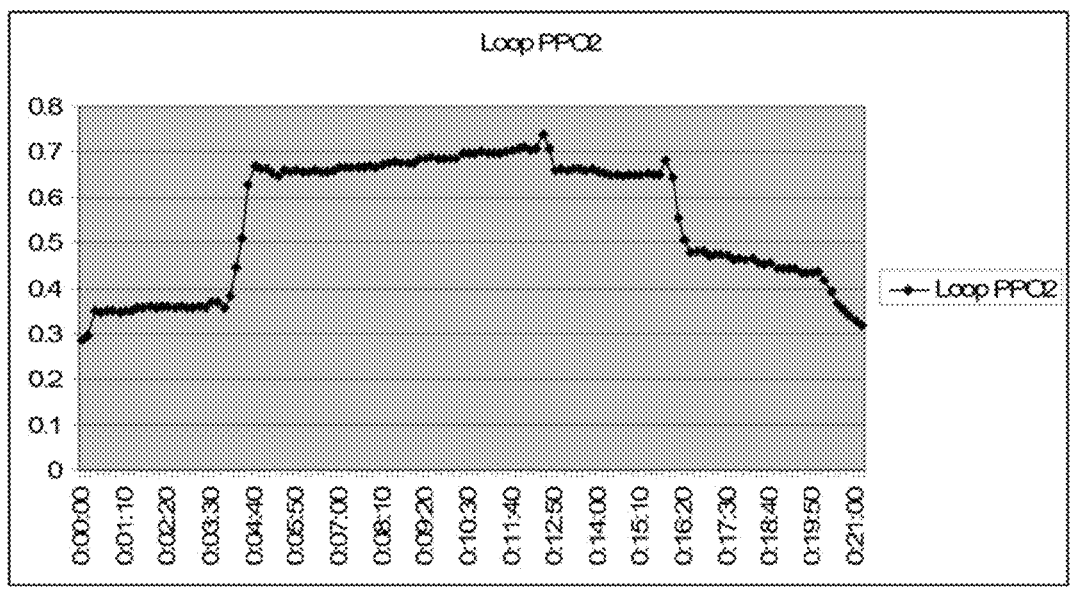
FIG. 4 shows an exemplary graphical representation of measured partial pressure of oxygen plotted as a function of time.
Figure 5:
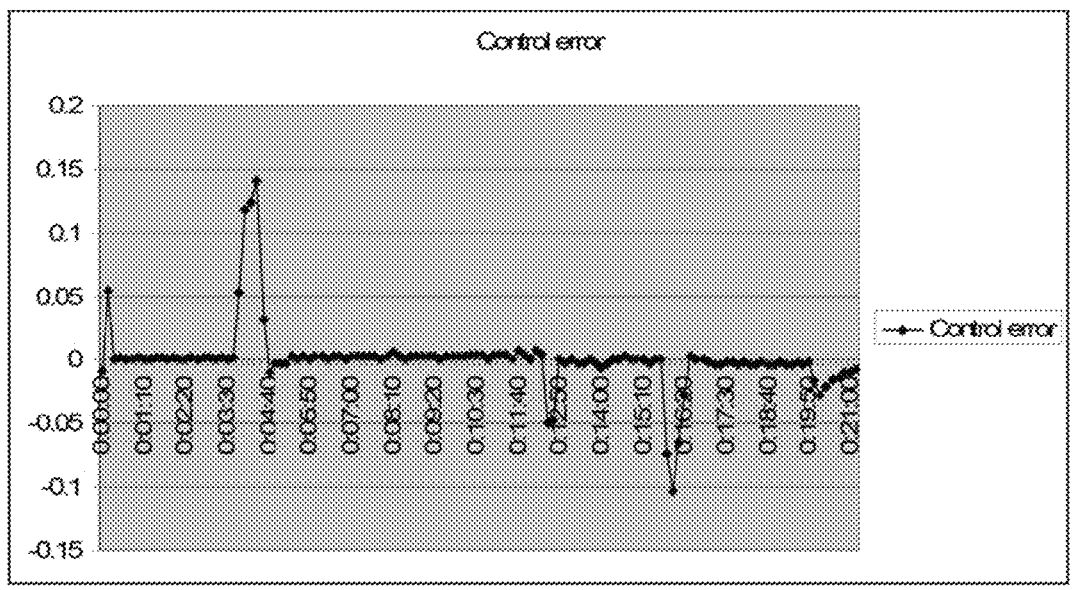
FIG. 5 shows an exemplary graphical representation of control error difference between setpoint for partial pressure of oxygen and measured partial pressure of oxygen plotted as a function of time.

In this working example, the setpoint S was continuously automatically adjusted corresponding to the changes in depth, as shown in FIGS. 2 and 3, and the partial pressure of oxygen in the rebreather loop as shown in FIG. 4 was controlled to the value calculated for S. FIG. 5 depicts the lag exhibited in the control system when depth and ambient pressure changed significantly in a short time period. Increasing depth caused the oxygen partial pressure setpoint to increase, and the oxygen partial pressure measured in the rebreather loop temporarily rose above the setpoint as addition of the gas supply continued after depth ceased to change. Decreasing depth correspondingly caused the oxygen partial pressure measured in the rebreather loop to temporarily drop below the setpoint.

Figure 6:
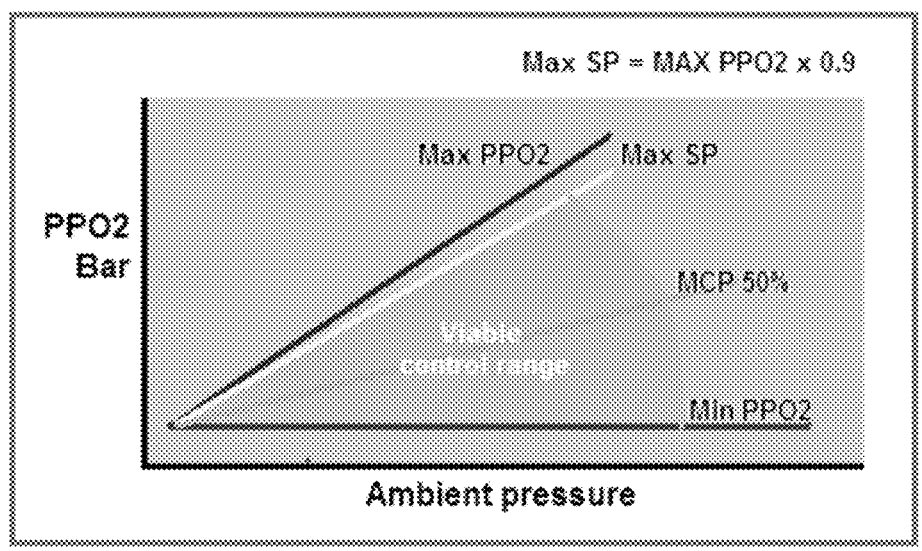
FIG. 6 shows an exemplary graphical representation of the operating range of partial pressure of oxygen as a function of ambient pressure, control parameter value and setpoint for partial pressure of oxygen.

As shown in FIG. 6, use of the present invention enables the diver to optimize gas usage by adjusting the control system within limits that are safe but are wider than would be available with a rebreather system that controls to a constant concentration of oxygen or partial pressure of oxygen in the rebreather loop. The wider range is determined by the ambient pressure, as well as the metabolic rate of the diver and the concentration of oxygen in the gas supply. In particular, a control system in accordance with the present invention will be more efficient compared to a rebreather system that controls to a constant concentration of oxygen because an acceptable partial pressure of oxygen can be maintained in the rebreather loop at shallower depths, where the ambient pressure is lower, using a lower rate of addition of gas supply.

A control system in accordance with the present invention will perform most efficiently if the partial pressure of oxygen is allowed to vary in conjunction with ambient pressure and diver metabolic rate. The overall allowable range of partial pressure of oxygen would need to ensure that partial pressure of oxygen does not fall below safe levels required for metabolism, and does not rise above levels associated with central nervous system toxicity. Within this wide operating range, the diver narrows the range to improve predictable operation of the rebreather system by choosing a value of the control parameter P that sets the bias of operation from conservative use of supply gas and low venting to high gas supply usage with higher partial pressure of oxygen and reduced potential for decompression requirements.

Another aspect of the present invention is the management of dive resources, dive resource usage rates, dive resource net effects, dive variables, dive time limitations and pre-selected dive plans. The viability of a pre-selected dive plan is determined by the types of factors shown in Table 2.

TABLE 2

| Type | Description |
| --- | --- |
| Dive resource | A capacity of the diving apparatus that can be measured or is known, and may be replenished |
| Dive resource usage rate | Change in dive resource over time |
| Dive resource net effect | Expected duration of a remaining dive resource based on usage rage |
| Dive variable | An environmental factor affecting decompression time, no decompression limit or central nervous system oxygen toxicity percentage |
| Dive time limitation | A dive requirement determined by decompression time, no decompression limit or central nervous system oxygen toxicity percentage |

TABLE 2-continued

| Type | Description |
|---|---|
| Dive plan | May comprise a target dive time and/or preselected dive-end values for one or more dive resources |

Figure 7:
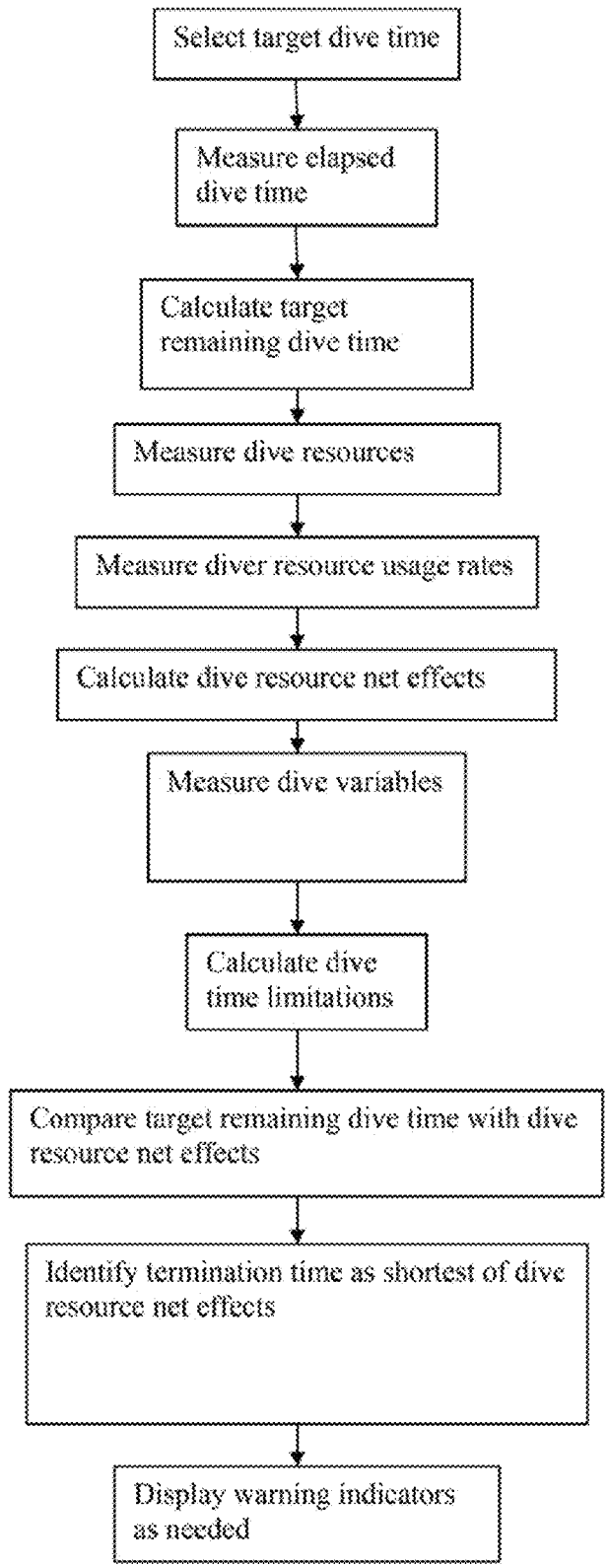
FIG. 7 shows a flowchart of a method embodying features of the present invention for managing dive resources, dive resource usage rates, dive resource net effects, dive variables and dive time limitations.

As shown in FIG. 7, dive resources, dive resource usage rates, dive resource net effects, dive variables and dive time limitations may be evaluated continuously to advise the diver regarding the status of the dive and to warn the diver if a pre-selected dive plan becomes non-viable. A processor configured in accordance with certain embodiments can calculate or receive data corresponding to, for example, pressure of a gas supply, scrubber capacity, battery capacity, decrease in pressure of the gas supply over time, number of injections from the gas supply into the rebreather breathing loop over time, electrical current, gas supply duration, scrubber canister duration, battery duration; depth, elapsed dive time, partial pressure of oxygen in the rebreather breathing loop, no decompression limit decompression time, central nervous system oxygen toxicity percentage, concentration of carbon dioxide in the rebreather breathing loop and temperature of the scrubber canister.

One of skill in the an will understand that dive resources, dive resource usage rates, dive resource net effects, dive variables and dive time limitations may be calculated and/or measured through suitable means known in the art. For example, no decompression limit and decompression time can be determined through using dive tables compiled by the United States Navy or tables derived from the Bühlmann decompression algorithm of other suitable decompression algorithms.

In a method in accordance with certain embodiments, a dive plan and resource changes are input by a user, and the duration remaining for each dive resource is determined from the dive resource measurement data and the calculated or measured usage rates. The dive resource having the shortest duration is identified as the controlling resource at that stage in the dive, and the duration to the completion of the dive plan or a segment of the dive plan is measured against the dive resource time remaining. If the duration of the identified dive resource is shorter than the duration to the completion of the dive plan or segment, then the duration of the identified dive resource and the dive resource type are displayed.

The viability of the dive plan or segment is determined based in part upon decompression requirements, no-decompression limit and dive segment target time. The dive plan or segment is 1. Viable, with no use of reserve resources;
2. Viable, with partial use of reserve resources; or
3. Not viable, exceeding available dive resources and reserve resources.

In certain embodiments, the processor and rebreather system display a bar graph of the dive resource having the shortest duration and a graphical indication of the dive viability. In certain embodiments, the processor and rebreather system display warning indicators corresponding to each category of viability. In certain embodiments, the warning indicators are color coded, such as green for category 1, yellow for category 2 and red for category 3.

In certain embodiments, the processor and rebreather system display a time countdown to dive resource completion for the dive resource having the shortest duration. In certain embodiments, the processor and rebreather system display an overrun time to indicate the magnitude by which the dive resource usage exceeds the duration of the dive resource so that the diver can take appropriate action.

Figure 8:
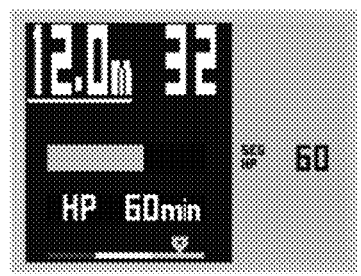
FIG. 8 shows an exemplary graphical representation of a warning indication corresponding to the viability of a dive that is displayed to a diver.
Figure 9:
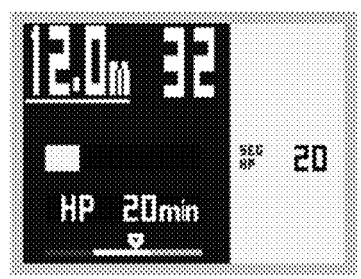
FIG. 9 shows an exemplary graphical representation of a warning indication corresponding to the viability of a dive that is displayed to a diver.
Figure 10:
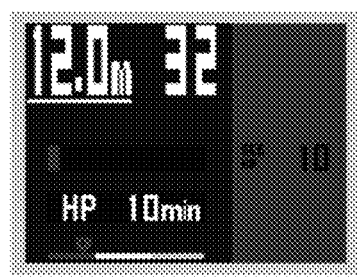
FIG. 10 shows an exemplary graphical representation of a warning indication corresponding to the viability of a dive that is displayed to a diver.

FIGS. 8, 9 and 10 provide exemplary graphical representations of the warning indications and duration data that may be displayed by a processor and rebreather system in accordance with certain embodiments. In the scenario depicted in FIG. 8, the gas supply is sufficient to complete the dive. Gas supply duration is less than other dive resources and the no-decompression limit. In this embodiment, the rebreather system displays green color-coding and the diver may continue the dive.

In the scenario depicted in FIG. 9, the gas supply is not sufficient to complete the planned dive without consuming reserve supply gas. In this embodiment, the rebreather system displays yellow color-coding, to warn the diver that the planned dive is not viable without using reserve dive resources.

In the scenario depicted in FIG. 10, the planned dive requires dive resources that exceed the sum of the primary gas supply and the reserve gas supply. In this embodiment, the rebreather system displays red color-coding to warn the diver that the planned dive is not viable and the diver should ascend.

Table 3 shows a prophetic example of dive resources, dive resource usage rates, dive resource net effects, dive variables and dive time limitations in which no decompression limit is less than the available dive resource net effects. Accordingly, the remaining available dive time is equal to the no decompression limit. All duration calculations are measured in minutes to the end of the dive resources and the beginning of reserve resources.

TABLE 3

| Dive Resource or Dive Time Limitation | Quantity or Duration Remaining | Rate of Consumption | Dive Resource Net Effect or Dive Time Limitation |
|---|---|---|---|
| Gas supply | 78 bar | 1 bar per min | 78 min |
| Scrubber duration | 436 gas injections | 5 injections per min | 86 min |
| No decompression limit | | | 67 min |
| Battery capacity | | | 340 min |
| Dive time remaining | | | 67 min |

Figure 11:
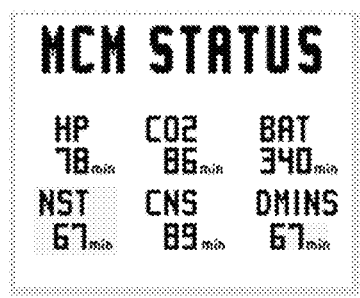
FIG. 11 shows an exemplary graphical representation of dive resource net effects and dive time limitations that are displayed to a diver.

FIG. 11 shows a prophetic example of a graphical representation of information in Table 3 as displayed to the diver.

Table 4 shows a prophetic example of dive resources, dive resource usage rates, dive resource net effects, dive variables and dive time limitations in which scrubber duration is the dive resource net effect or dive time limitation of shortest duration. Accordingly, the remaining available dive time is equal to the scrubber duration. All duration calculations are measured in minutes to the end of the dive resources and the beginning of reserve resources.

TABLE 4

| Dive Resource or Dive Time Limitation | Quantity or Duration Remaining | Rate of Consumption | Dive Resource Net Effect or Dive Time Limitation |
| --- | --- | --- | --- |
| Gas supply | 78 bar | 1 bar per min | 78 min |
| Scrubber duration | 280 injections | 5 injections per min | 56 min |
| No decompression limit | | | 67 min |
| Battery capacity | | | 340 min |
| Dive time remaining | | | 56 min |

Figure 12:
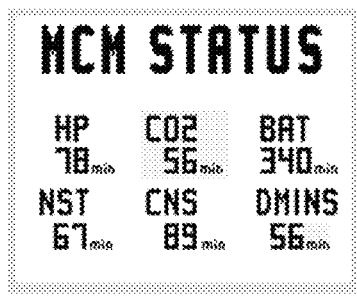
FIG. 12 shows an exemplary graphical representation of dive resource net effects that are displayed to a diver.

FIG. 12 shows a prophetic example of a graphical representation of information in Table 4 as displayed to the diver.

Scrubber duration is not affected by the selected value of the control parameter P and instead is inversely proportional to diver metabolic rate. Increasing depth generally induces higher diver metabolic rate. Although diver metabolic rate is not a variable controlled by the rebreather system, carbon dioxide concentration and rate of addition can be measured to inform the diver of the quality of the breathing gas and warn the diver of decreasing scrubber duration.

Table 5 shows a prophetic example of dive resources, dive resource usage rates, dive resource net effects, dive variables and dive time limitations in which gas supply is the resource of shortest duration. Accordingly, the remaining available dive time is equal to the gas supply duration. All duration calculations are measured in minutes to the end of the dive resources and the beginning of reserve resources.

TABLE 5

| Dive Resource or Dive Time Limitation | Quantity or Duration Remaining | Rate of Consumption | Dive Resource Net Effect or Dive Time Limitation |
| --- | --- | --- | --- |
| Gas supply | 48 bar | 1 bar per min | 48 min |
| Scrubber duration | 436 injections | 5 injections per min | 86 min |
| No decompression time | 67 min | | 67 min |
| Battery level | | | 340 min |
| Dive time remaining | | | 48 min |

Figure 13:
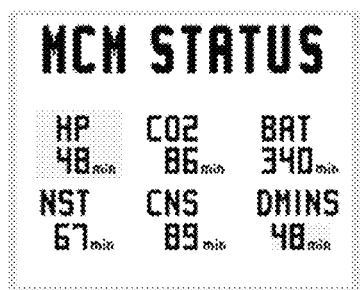
FIG. 13 shows an exemplary graphical representation of dive resource net effects that are displayed to a diver.

FIG. 13 shows a prophetic example of a graphical representation of information in Table 5 as displayed to the diver.

Table 6 shows a prophetic example of dive resources, dive resource usage rates, dive resource net effects, dive variables and dive time limitations in which additional dive time is viable in excess of the required decompression time. All duration calculations are measured in minutes to the end of the dive resources and the beginning of reserve resources.

TABLE 6

| Dive Resource or Dive Time Limitation | Quantity or Duration Remaining | Rate of Consumption | Dive Resource Net Effect or Dive Time Limitation |
| --- | --- | --- | --- |
| Gas supply | 200 bar | 1 bar per min | 200 mins |
| Scrubber duration | 500 injections | 5 injections per min | 100 mins |
| Decompression time | 60 min | | 60 min |
| Battery capacity | 3000 mA-hr | 30 mA | 6000 min |
| Additional dive time available at depth | | | 40 min |

Table 7 shows a prophetic example of dive resources, dive resource usage rates, dive resource net effects, dive variables and dive time limitations in which the shortest duration dive resource, specifically, scrubber canister duration, is equal to required decompression time. In this exemplary scenario, continuing the dive would not be viable and the diver would need to begin the ascent, including decompression stops, immediately. All duration calculations are measured in minutes to the end of the dive resources and the beginning of reserve resources.

TABLE 7

| Dive Resource or Dive Time Limitation | Quantity or Duration Remaining | Rate of Consumption | Dive Resource Net Effect or Dive Time Limitation |
|---|---|---|---|
| Gas supply | 200 bar | 1 bar per min | 200 mins |
| Scrubber duration | 500 injections | 5 injections per min | 100 mins |
| Decompression time | 100 min | | 100 min |
| Battery level | 3000 mA-hr | 30 mA | 6000 min |
| Additional dive time available at depth | | | 0 min |

Table 8 shows a prophetic example of dive resources, dive resource usage rates, dive resource net effects, dive variables and dive time limitations in which scrubber duration based on volume of gas supply usage is the resource of shortest duration. Scrubber duration exceeds target dive time, and additional dive time at depth is available. All duration calculations are measured in minutes to the end of the dive resources and the beginning of reserve resources.

TABLE 8

| Dive Resource or Time Dive Limitation | Quantity or Duration Remaining | Rate of Consumption | Dive Resource Net Effect or Dive Time Limitation |
|---|---|---|---|
| Gas supply | 200 bar | 1 bar per min | 200 min |
| Gas supply (metabolic rate) | 200 bar | 1.6 liter $O_2$ per min | 130 min |
| Scrubber duration | 500 injections | 5 injections per min | 100 min |
| Scrubber duration (thermal profile) | | | 120 min |
| Scrubber duration (carbon dioxide concentration) | <0.4 mB | | |
| Diver metabolic rate | 1.2 liter $O_2$ per min | | |
| Battery capacity | 3000 mA-hr | 30 mA | 6000 min |
| No decompression limit | 90 min | | |
| Decompression time | none | | |
| CNS toxicity percentage | 10% | 0.5% per min | 140 min |
| Target dive time | | | 80 min |
| Additional dive time available at depth | | | 20 min |

Table 9 shows a prophetic example of dive resources, dive resource usage rates, dive resource net effects, dive variables and dive time limitations in which scrubber duration based on volume of gas supply usage is the resource of shortest duration. Target dive time exceeds scrubber duration. Accordingly, continuing the dive would not be viable and the diver would need to begin the ascent, including decompression stops, immediately. All duration calculations are measured in minutes to the end of the dive resources and the beginning of reserve resources.

TABLE 9

| Dive Resource or Time Dive Limitation | Quantity or Duration Remaining | Rate of Consumption | Dive Resource Net Effect or Dive Time Limitation |
|---|---|---|---|
| Gas supply | 200 bar | 1 bar per min | 200 min |
| Gas supply (metabolic rate) | 200 bar | 1.6 liter $O_2$ per min | 130 min |
| Scrubber duration | 500 injections | 5 injections per min | 100 min |
| Scrubber duration (thermal profile) | | | 120 min |
| Scrubber duration (carbon dioxide concentration) | <0.4 mB | | |
| Diver metabolic rate | 1.2 liter $O_2$ per min | | |
| Battery capacity | 3000 mA-hr | 30 mA | 6000 min |

TABLE 9-continued

| Dive Resource or Time Dive Limitation | Quantity or Duration Remaining | Rate of Consumption | Dive Resource Net Effect or Dive Time Limitation |
|---|---|---|---|
| No decompression limit | 90 min | | |
| Decompression time | none | | |
| CNS toxicity percentage | 10% | 0.5% per min | 140 min |
| Target dive time | | | 120 min |
| Additional dive time available at depth | | | −20 min |

Implementation of the inventive method for managing dive resources has been illustrated in the foregoing prophetic examples with regard to a rebreather system in accordance with embodiments of the invention. However, the inventive method for managing dive resources could alternatively be applied to any rebreather or diving system where resources are limited and must be used in combination with the diver's decompression or physiological requirements.

In accordance with the present invention, one with ordinary skill in the art will understand that data measurements can be taken and calculations can be perforated with regard to dive resources, dive resource usage rates, dive resource net effects, dive variables and dive time limitations at a frequency suitable to insure that the inventive method and apparatus can monitor and indicate rapid changes in any of these quantities.

Although the present invention has been described in considerable detail with reference to certain embodiments thereof, other embodiments are possible. Therefore, the spirit and scope of the appended claims should not be limited to the description of the embodiments contained therein.

What is claimed is:

1. A dive resource management system for a rebreather breathing loop comprising:
a gas supply, wherein the gas supply is a single gas mix;
a gas supply pressure regulator;
a scrubber canister;
a counterlung;
a first sensor adapted to measure ambient pressure; a pressure transducer adapted to indicate depth as a function of ambient pressure;
a second sensor adapted to measure partial pressure of oxygen;
a first valve adapted to add the gas supply to the rebreather breathing loop;
a power source;
a clock;
connecting hoses;
check valves adapted to control the direction of flow of gas in the rebreather breathing; and
a processor adapted to
receive data for target dive time, elapsed dive time, pressure of a gas supply, battery capacity, decrease in pressure of the gas supply over time, electrical current, depth and or partial pressure of oxygen in the rebreather breathing loop,
calculate target remaining dive time, gas supply duration, battery duration, no decompression limit, decompression time, and central nervous system oxygen toxicity percentage and remaining dive times for each dive variable of gas supply duration, battery duration, no decompression limit, decompression time and central nervous system oxygen toxicity percentage, and
determine a dive termination time corresponding to the lowest value of the target remaining dive time and the remaining dive times calculated for each dive variable,
wherein the processor is further adapted to send a signal to adjust a setpoint for partial pressure of oxygen in the rebreather breathing loop,
wherein the setpoint is automatically and continuously calculated and adjusted throughout a dive using diver selected values for a control parameter, a reduction coefficient, and a partial pressure of oxygen,
wherein the partial pressure of oxygen is based on a concentration of oxygen in the gas supply and ambient pressure; and
wherein the gas supply is a single high-pressure source containing an oxygen-enriched gas mixture where the concentration of oxygen is less than 100%.

2. The dive resource management system of claim 1 further comprising a graphical display.

3. The dive resource management system of claim 1, wherein the gas supply consists of a single high-pressure source containing an oxygen-enriched gas mixture.

4. The dive resource management system of claim 1, wherein the partial pressure of oxygen in the rebreather breathing loop is controlled to a value of the setpoint±0.05 bar.

5. The dive resource management system of claim 1, wherein the reduction coefficient is between 0.75 and 0.95.

6. The dive resource management system of claim 1 further comprising:
a third sensor adapted to measure concentration of carbon dioxide;
a fourth sensor adapted to measure temperature of the scrubber canister.

7. The dive resource management system of claim 6, wherein the processor calculates a scrubber canister duration and a remaining dive time corresponding to the scrubber canister duration from signals received from the third and fourth sensors, number of injections from the gas supply via the first valve into the rebreather breathing loop and temperature of the scrubber canister.

8. The dive resource management system of claim 7, wherein the dive termination time corresponds to the lowest value of the target remaining dive time, the remaining dive times of the calculated dive variables and the remaining dive time corresponding to the scrubber canister duration.

9. The dive resource management system of claim 2 wherein the processor is further adapted to send a signal to the graphical display to display the dive termination time.

10. The dive resource management system of claim 2, wherein the processor sends a signal to the graphical display to display a warning indicator when the dive termination time is equal to or less than the target remaining dive time.

11. The dive resource management system of claim 1, wherein the setpoint is adjusted to a partial pressure of oxygen level that can be maintained within limits established by safety considerations and depth, and the control parameter may be varied to suit a dive plan and yield a setpoint that balances decompression time and gas usage.

12. The dive resource management system of claim 11, wherein the control parameter is a value expressed as a percentage of a range between minimum and maximum safe partial pressures of oxygen.

13. The dive resource management system of claim 12, wherein the control parameter varies between 0% and 100%.

* * * * *